ROBERT W. MCGINNIS.
ROBERT G. MOORE JR
INVENTORS

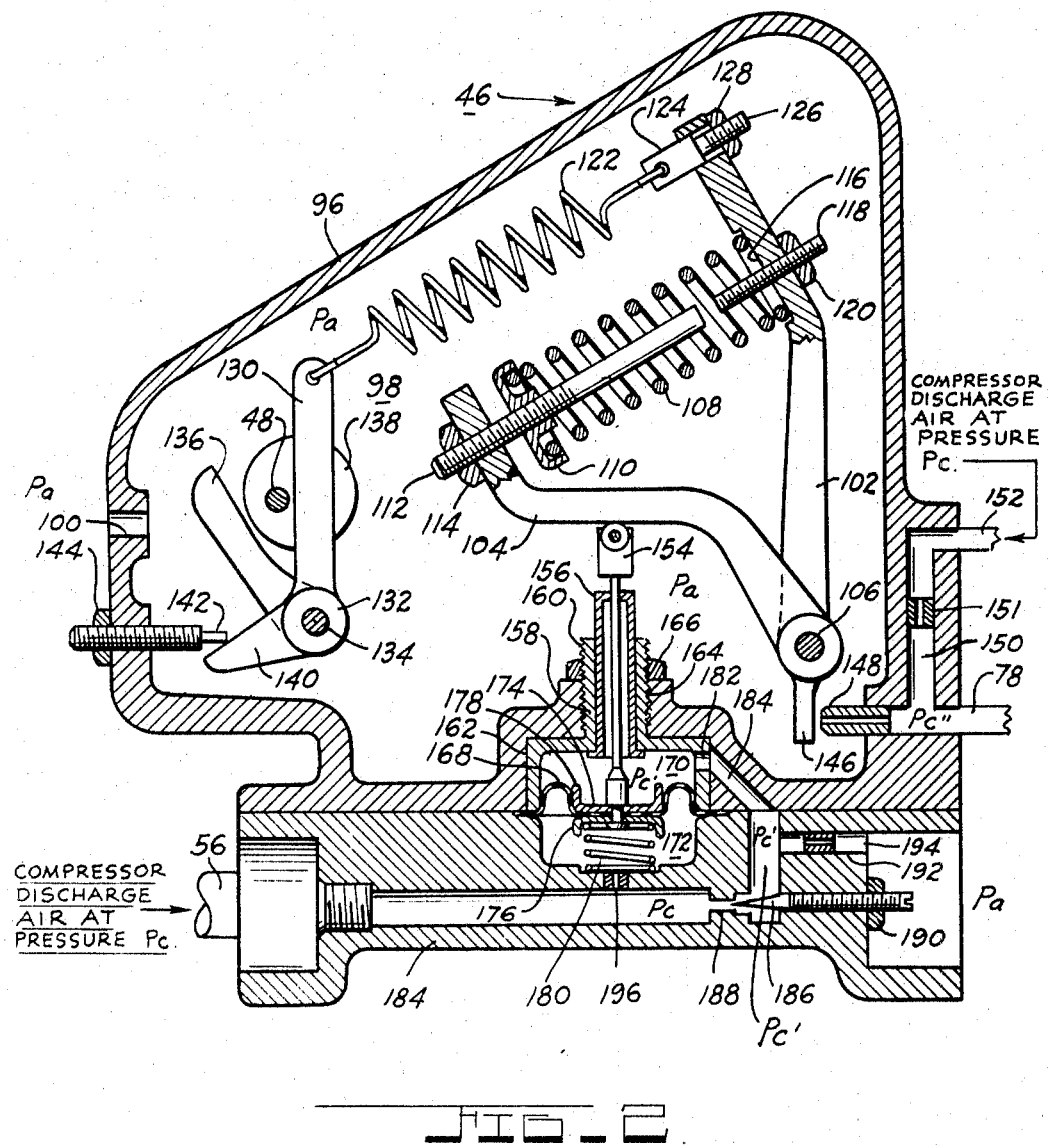

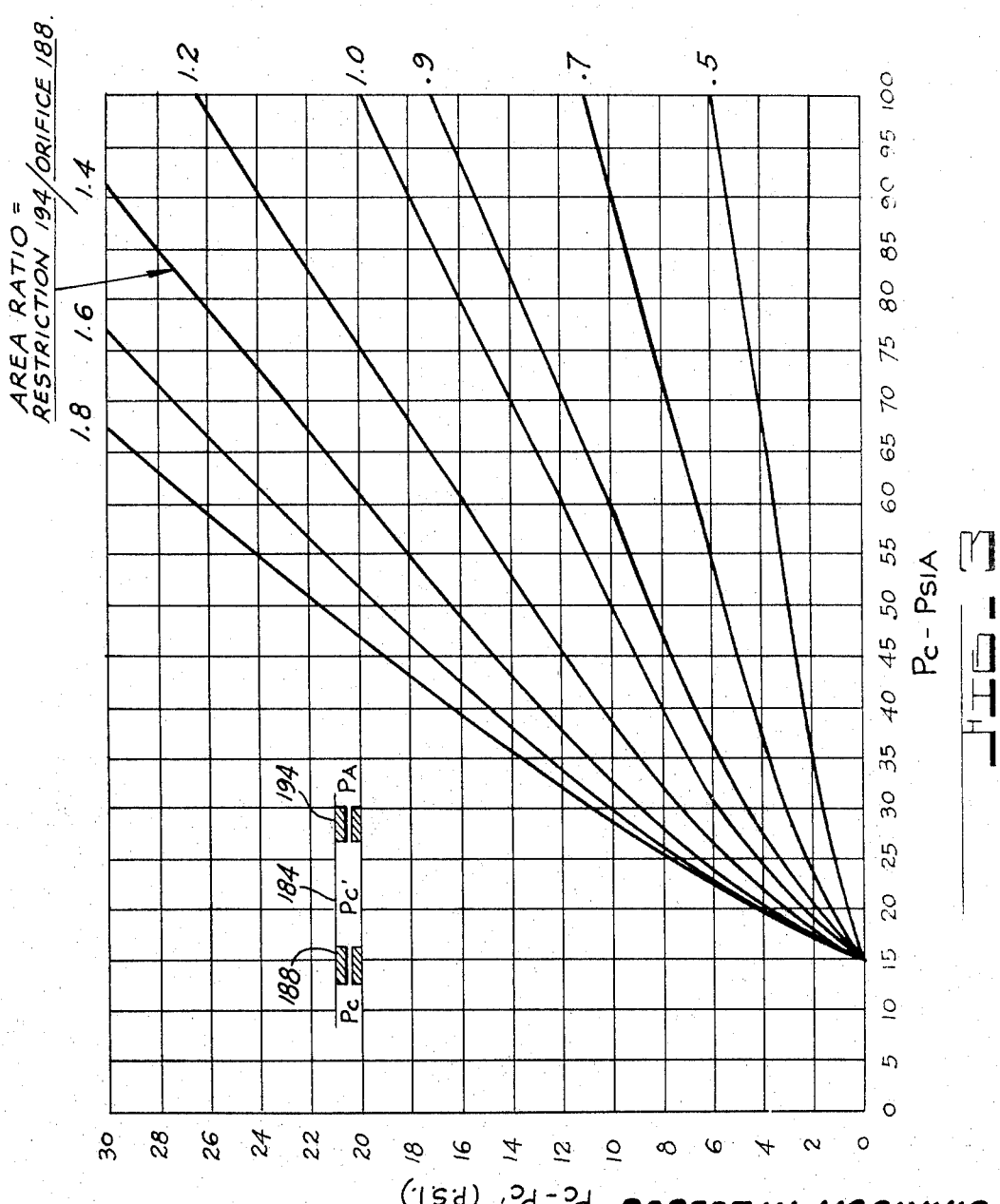

United States Patent Office 3,438,199
Patented Apr. 15, 1969

3,438,199
FUEL CONTROL APPARATUS, INCLUDING A PNEUMATIC ALL-SPEED GOVERNOR FOR CONTROLLING THE OPERATION OF A COMBUSTION ENGINE
Robert W. McGinnis and Robert G. Moore, Jr., South Bend, Ind., assignors to The Bendix Corporation, a corporation of Delaware
Filed Mar. 8, 1967, Ser. No. 621,532
Int. Cl. F02k *11/00;* F02c *9/04, 7/22*
U.S. Cl. 60—39.28                              8 Claims

ABSTRACT OF THE DISCLOSURE

An all-speed engine governor having a fluid pressure responsive member which responds to an engine air compressor generated air pressure to generate a force varying as a function of engine speed in opposition to a reference force established by the position of a control lever. The fluid pressure responsive member is connected to actuate a valve which modifies the pressure level of engine air compressor generated air pressure to which a fuel metering valve responds.

Background of the invention

This invention relates to fluid pressure operated governor apparatus responsive to engine air compressor generated air pressure which varies as a function of engine speed.

It has been the practice to utilize engine speed governors wherein one or more fly weights rotatably actuated by the engine to be controlled provide a control force which varies as a function of engine speed. Such fly weight governors have a number of disadvantages among which are dependence for mechanical drive from the engine which normally requires mounting of the governor on the engine, relatively high cost due to closely held manufacturing tolerances, and fixed operating characteristics which preclude adjustment for calibration purposes.

Summary of the invention

The present invention provides a pneumatic all-speed engine governor operative in response to an engine generated air pressure which varies as a predetermined function of engine speed thereby eliminating the need for conventional centrifugal speed weights and simplifying the governor apparatus accordingly. The present pneumatic all-speed governor includes mechanism for controlling the governor gain to a substantially constant value over the operating speed range of the engine.

It is an object of the present invention to provide a simple and reliable pneumatic all-speed engine governor responsive to an input engine generated air pressure and adapted to modify an output control fluid pressure for engine control purposes in accordance with an engine speed error between a selected speed and existing speed.

It is another object of the present invention to provide a pneumatic all-speed engine governor which senses an engine generated air pressure which varies as a function of engine speed and may be easily transmitted from the engine to the governor by means of a fluid conduit.

Another object of the present invention is to provide an all-speed engine governor having adjustable resilient speed reference force mechanism and opposing force generating means responsive to an engine generated air pressure which varies as a function of engine speed wherein the adjustable resilient reference force mechanism exerts a certain effective spring rate at one engine speed and a different effective spring rate at another engine speed.

Other objects and advantages of the present invention will become apparent from the following description taken with the accompanying drawings wherein:

FIGURE 2 is a view of the present invention shown in detail and removed from the fuel system of FIGURE 1.

FIGURE 3 is a plot of compressor discharge air pressure $P_c$ vs. air pressure differential $P_c-P_c'$ for various area ratios of two restrictions in series flow relationship.

Figure 1:
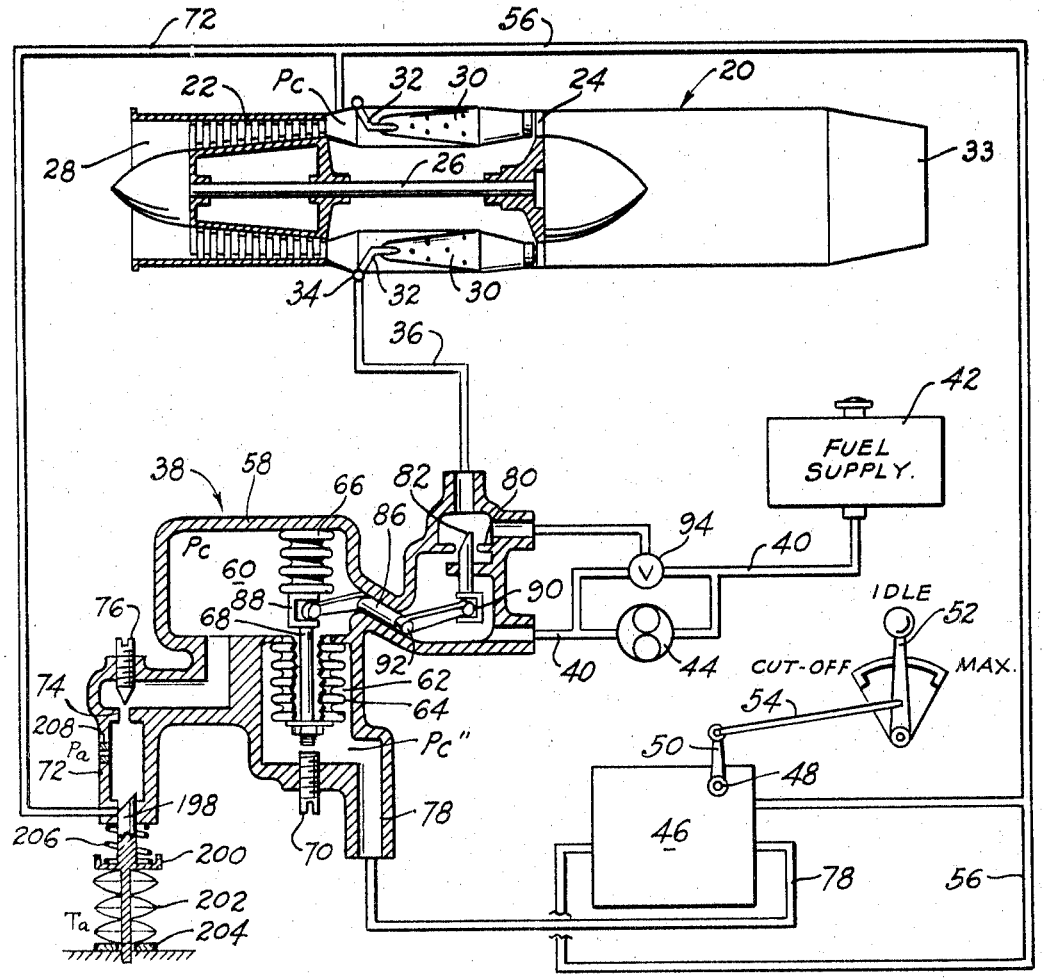
FIGURE 1 is a schematic representation of a gas turbine engine and a fuel control system therefor embodying the present invention.

FIGURE 1 illustrates a conventional jet engine of the gas turbine type 20 having an air compressor 22 rotatably driven by a gas turbine 24 through a rotatably mounted shaft 26. The compressor 22 receives air via inlet 28 and discharges pressurized air at pressure $P_c$ to combustion chambers 30 wherein pressurized fuel injected thereto via fuel nozzles 32 is mixed with the pressurized air and burned to provide hot motive gas which passes through turbine 24 to drive the same. The gas exhausted from turbine 24 passes through an exhaust nozzle 33 to the atmosphere thereby generating thrust. The gas turbine engine 20 is described as the jet type but it will be understood that the present invention is applicable to gas turbine engines other than the jet type as, for instance, the free turbine type wherein a second gas turbine, not shown, absorbs the remaining energy of the gas exhausted from turbine 24 to provide a torque output for external use.

The fuel nozzles 32 may be connected to an annular fuel manifold 34 which receives pressurized metered fuel via an outlet fuel conduit 36 from a fuel control generally indicated by 38 which receives unmetered pressurized fuel via inlet conduit 40 connected to a fuel supply 42. An engine driven fuel pump 44 in conduit 40 pressurizes the fuel passing therethrough.

The fuel control 38 embodies the present pneumatic governor mechanism generally indicated by 46 which is provided with an input shaft 48 rotatably actuated by a lever 50 suitably connected thereto and responsive to the position of a manually actuated control lever 52 via link 54. A conduit 56 leading from the discharge section of compressor 22 to governor 46 supplies air at compressor discharge pressure $P_c$ to the governor 46 for control purposes as will be described hereinafter.

The fuel control 38 with the exception of the governor mechanism 46 is substantially the same as the fuel control shown and described in Patent No. 3,040,529, issued June 26, 1962, to J. E. Hurtle (common assignee) and entitled "Pneumatic Fuel Control" to which reference is made for specific details of structure and operation of a fuel control particularly adapted to operate with the present pneumatic fuel governor which does not require conventional centrifugal fly weights.

The fuel control 38 includes a casing 58 defining chambers 60 and 62 separated by a bellows 64 fixedly secured at one end to casing 58 by any suitable means such as brazing to provide a fluid seal between chambers 60 and 62. An evacuated bellows 66 contained by chamber 60 is anchored at one end to casing 58 and attached at the opposite end to the movable end of bellows 64 via a rigid link 68. An adjustable stop 70 threadedly engaged with casing 58 is engaged by link 68 to thereby limit the expansion of bellows 64 and 66 accordingly. The chamber 60 is vented to compressor discharge air pressure $P_c$ via a conduit 72 the effective flow area of which may be varied by an orifice 74 and associated adjustable valve 76 threadedly engaged with casing 58. The chamber 62 is vented via a conduit 78 to governor 46 which controls the air pressure level in chamber 62 as will be described hereinafter.

The casing 58 is provided with a fuel metering orifice 80 which controls the flow of pressurized fuel from inlet conduit 40 to outlet conduit 36. The effective flow area of orifice 80 is controlled by a metering valve 82 slidably carried in orifice 80 and actuated by the bellows 64 and 66 via a connecting link generally indicated by 86. The link 86 may be of any suitable type providing a positive seal between the pressurized fuel passing to metering orifice 80 and the pressurized air in chamber 60. However, the link 86 is shown as being of the conventional torque tube type having one end secured in a slot 88 in link 68 and an opposite end secured in a slot 90 of valve 82. The intermediate portion 92 of link 86 acts as a torque link which functions to position metering valve 82 in accordance with the axial position of link 68. A conventional fuel by-pass valve generally indicated by 94 is sensitive to the fuel pressure differential across metering orifice 80 and operative to pass fuel from inlet conduit 40 downstream from pump 44 to inlet conduit 40 upstream from pump 44 as necessary to maintain a predetermined constant pressure differential across orifice 80 irrespective of the area thereof.

The pneumatic governor 46 includes a casing 96 defining a chamber 98 communicating with a relatively low pressure drain source such as the atmosphere at pressure $P_a$ via a port 100. Levers 102 and 104 in chamber 98 are pivotally mounted on a fixed support 106 carried by casing 96. A compression spring 108 interposed between levers 102 and 104 is retained at one end by an adjustable retainer 110 threadedly engaged with an adjustable rod 112 which, in turn, is aligned with spring 108 and threadedly engaged with lever 102 and locked in a desired position by a lock nut 114 threadedly engaged therewith. The opposite end of spring 108 is retained by a suitable recess 116 formed in lever 102. An adjustable stop 118 axially aligned with spring 108 and threadedly engaged with lever 102 is adapted to abut the end of rod 112. A locknut 120 threadedly engaged with stop 118 serves to lock the same in a desired position.

A tension spring 122 is retained at one end by an adjustable retainer 124 slidably carried by lever 102 and is provided with a threaded portion 126 which receives a nut 128 bearing against lever 102. The opposite end of tension spring 122 is retained by one end of an arm 130 of a multiarmed member 132 rotatably supported by a fixed support 134 carried by casing 96. A second arm or follower 136 of member 132 bears against a cam 138 eccentrically mounted on shaft 48 rotatably carried by casing 96 and actuated in response to movement of control lever 52. A third arm 140 of member 132 is adapted to engage an adjustable idle stop 142 threadedly engaged with casing 96 and locked in position by a lock nut 144 threadedly engaged therewith.

The lever 102 is provided with an arm or flapper 146 adapted to cooperate with an orifice 148 installed at the discharge end of a passage 150 which contains a fixed area restriction 151 and is supplied air at compressor discharge pressure $P_c$ via a conduit 152 communicating with conduit 56 and discharges to chamber 98 at atmospheric pressure $P_a$.

The lever 102 bears against one end of a stem 154 slidably carried by a tubular guide 156 which, in turn, is fixedly secured as by a press fit to a support 158 having axially aligned threaded end portion 160 and oppositely extending cup shaped portion 162. The threaded end portion 160 extends through an opening 164 in casing 96 into engagement with a locknut 166 which bears against casing 96 thereby locking support 158 in position. A flexible diaphragm 168 clamped at its radially outermost portion between casing 96 and the annular edge of cup shaped portion 162 together with cup shaped portion 162 defines a chamber 170. The diaphragm 168 separates chamber 170 from a second chamber 172 defined by casing 96 and diaphragm 168. One end of stem 154 is fixedly secured to the center portion of diaphragm 168 by circular back up plates 174 and 176 between which the diaphragm 168 is clamped. The back up plate 174 is provided with an annular wall 178 which engages cup shaped portion 162 to thereby limit the movement of diaphragm 168 accordingly. A compression spring 180 interposed between plate 176 and casing 96 serves to preload diaphragm 168.

The chamber 170 receives compressor discharge air via an opening 182 in cup shaped portion 162 and a conduit 184 leading to conduit 56. The effective flow area of conduit 184 may be varied by adjusting the position of a tapered valve 186 threadedly engaged with casing 96 relative to an associated orifice 188 secured in conduit 184. A locknut 190 threadedly engaged with valve 186 locks the same in a desired position. A passage 192 containing a fixed area restriction 194 vents conduit 184 downstream of orifice 188 to atmospheric air pressure $P_a$.

The chamber 172 receives compressor discharge air via a fixed area restriction 196 communicating with conduit 184 upstream from orifice 188.

The compressor discharge air pressure $P_c$ passing through conduit 72 to chamber 60 is modified by a valve 198 slidably carried by casing 58 and adapted to control the effective flow area of conduit 72 as a function of ambient air temperature $T_a$. To that end, the valve 198 is provided with a flange 200. A stack of temperature responsive capsules 202, exposed to ambient air is interposed between flange 200 and a fixed support 204 so as to urge valve 198 upward and downward as viewed in FIGURE 1 in response to contraction and expansion of capsules 202 caused by a decrease or increase, respectively, temperature of ambient air. A spring 206 interposed between casing 58 and flange 200 preloads valve 198 against the capsules 202. A restriction 208 downstream of valve 198 vents passage 72 to relatively low atmospheric air pressure $P_a$ thereby maintaining a minimum air flow through valve 198 for control purposes.

It will be assumed that the engine is operating initially at steady state idle in response to the position of control lever 52 in accordance with which the various component elements occupy the positions shown in FIGURES 1 and 2. To accelerate the engine to maximum speed, the control lever 52 is actuated to the maximum speed position.

The shaft 48 and attached cam 138 rotate in response to movement of control lever 52 causing arm or follower 136 to pivot counterclockwise as viewed in FIGURE 2, which, in turn, causes arms 130 and 140 integral therewith to pivot counterclockwise accordingly. The tension spring 122 is stretched accordingly increasing the force acting through lever 102 against compression spring 108 which is compressed allowing stop 118 to engage rod 112 thereby eliminating the force effect of compressor spring 108 on lever 104 whereupon lever 104 is urged in a counterclockwise direction against the resistance of stem 154. The resisting force of stem 154 is derived from the differential in pressures $P_c$ and $P_c'$ in chambers 172 and 170, respectively, acting across diaphragm 168 plus the relatively light preload of spring 180 acting against diaphragm 168. The flapper 146 integral with lever 102 is biased against orifice 148 thereby blocking flow therefrom which, in turn, results in the air pressure $P_c''$ downstream from restriction 151 increasing to full compressor discharge air pressure $P_c$. The compressor discharge air pressure $P_c$ is transmitted through passage 78 to chamber 62 on the one side of bellows 64. The opposite side of bellows 64 is exposed to compressor discharge air pressure $P_c$ transmitted to chamber 60 via conduit 72 which results in a zero pressure differential across bellows 64 whereupon the bellows 64 generated force resisting contraction of bellows 66 is reduced accordingly. The resulting contraction of bellows 66 in response to the compressor discharge air pressure $P_c$ in chamber 60 causes movement of torque link 86 thereby urging metering valve 82 in an opening direction which, in turn, increases fuel flow to the engine to accelerate the same. As the engine accelerates, the compressor discharge air pressure $P_c$ increases and is transmitted to chamber 60 where bellows 66 is further compressed causing the metering valve 82 to open thereby continuously increasing fuel flow to the engine as a function of the rising compressor discharge air pressure $P_c$.

As the engine accelerates and approaches the requested maximum speed, the increasing compressor discharge air pressure $P_c$ transmitted to chamber 172 via conduits 56, 184 and restriction 196 acts against diaphragm 168 in opposition to the modified compressor discharge air pressure $P_c'$ transmitted to chamber 170 via conduits 56 and 184 and controlled by the effective area ratio of orifice 188 and restriction 194. The modified pressure $P_c'$ generated intermediate orifice 188 and restriction 194 and thus the $P_c - P_c'$ pressure differential across diaphragm 168 varies as a predetermined function of compressor discharge pressure $P_c$ in accordance with the area ratio of orifice 188 and restriction 194. With reference to FIGURE 3, there is shown a plot of air pressure differential $P_c - P_c'$ versus compressor discharge air pressure $P_c$ for various area ratios of orifice 188 and restriition 194 which illustrate the manner in which the modified air pressure $P_c'$ may be varied. It will be noted that the rate of change of air pressure differential $P_c - P_c'$ relative to air compressor discharge pressure $P_c$ is substantially constant for values of $P_c/P_a \geq 2$ where $P_a$ represents the atmospheric pressure to which the downstream restriction 194 exhausts. Upon reaching a predetermined compressor discharge air pressure $P_c$, governor break action will occur when the resulting air pressure differential $P_c - P_c'$ across diaphragm 168 generates a force which overcomes the opposing force of tension spring 122 applied through levers 102 and 104 against stem 154 causing the levers 104 and 102 to pivot counterclockwise which, in turn, results in movement of flapper 146 to open orifice 148 thereby venting passage 150 to atmosphere air pressure $P_a$. The air pressure $P_c''$ intermediate restriction 151 and orifice 148 decreases in accordance with the degree to which orifice 148 is open by flapper 146 thereby causing a corresponding drop in air pressure in chamber 62 and thus increase in pressure differential $P_c - P_c''$ across bellows 64. The force generated by the $P_c - P_c''$ pressure differential across bellows 64 acts in opposition to the force derived from pressure $P_c$ acting against the bellows 66 thereby urging torque link 86 in a direction to close metering valve 82 causing a decrease in fuel flow to the engine. Following the above described governor break action, subsequent increases in air pressure differential $P_c - P_c'$ across diaphragm 168 further load levers 104 and 102 in opposition to tension spring 122 causing flapper 146 to move accordingly thereby increasing the effective area of orifice 148 which, in turn, reduces the pressure $P_c''$ acting against bellows 64 to reduce fuel flow thereby establishing a substantially proportional governor droop. Upon reaching the selected engine speed, the opposing torques derived from the pressure differential $P_c - P_c'$ acting across diaphragm 168 and the tension spring 122 acting through the respective levers 104 and 102 balance thereby stabilizing flapper 146 which, in turn, regulates air pressure $P_c''$ to bellows 64 to stabilize metering valve 82 and establish the necessary flow of metered fuel required by the engine for steady state operation at the selected speed.

Engine speed variations from the selected speed results in a corresponding variation in compressor discharge air pressure $P_c$ and thus pressure differential $P_c - P_c'$ across diaphragm 168 which upsets the force balance on lever 102 which, in turn, positions flapper 146 to cause an increase or decrease in fuel flow depending upon the relative speed error and regulate engine speed to the selected value.

While the above described engine operation is in terms of an acceleration to maximum speed, it will be understood that an acceleration from engine idle to any higher speed as established by the selecting of control lever 52 may be accomplished with the same sequence of operation of the governor heretofore described. Since the heretofore mentioned pressure ratio relationship $P_c/P_a \geq 2$ may be considered valid for gas turbine engine speeds above idle, the governor droop or gain will remain constant regardless of the speed to which the engine is accelerated.

The engine may be decelerated by actuating control lever from the maximum speed position to idle position whereupon cam 138 is rotated accordingly to the position shown in FIGURE 2 where arm 140 abuts stop 142. The tension spring 122 is relaxed reducing the force applied to lever 102 whereupon the existing opposing force derived from diaphragm 168 in response to the pressure differential $P_c - P_c'$ thereacross urges lever 104 and 102 in a clockwise direction causing flapper 146 to move away from orifice 148 and open the latter to a maximum area which, in turn, causes an instantaneous reduction in pressure $P_c''$ to which bellows 64' responds thereby moving metering valve 82 in a closing direction. The area relationship of orifice 148 and restriction 151 may be selected to establish a desired intermediate pressure $P_c''$ when orifice 148 is wide open so that the response of bellows 64 and thus metering valve 82 establishes a predetermined minimum fuel flow to avoid flame out of the combustion process. The reduced fuel flow is not sufficient to maintain maximum engine speed and the engine decelerates accordingly. As the engine decelerates, the compressor discharge air pressure $P_c$ and thus pressure $P_c''$ decreases as a function of engine speed in response to which the bellows 64 continuously moves metering valve 82 in a closing direction thereby establishing a regulated minimum fuel flow as a function of compressor discharge pressure $P_c$ during deceleration. As the engine approaches idle speed, the compressor discharge air pressure $P_c$ and thus pressure differential $P_c - P_c'$ is reduced accordingly until the force derived from diaphragm 168 permits compression spring 108 to expand thereby urging levers 102 and 104 apart and reducing the effective spring rate of the series arranged tension spring 122 and compression spring 108 accordingly allowing lever 102 to pivot counterclockwise thereby moving flapper 146 toward orifice 148 to cause an increase in pressure $P_c''$ in response to which bellows 64 contracts causing metering valve 82 to move in an opening direction to increase fuel flow and stabilize engine operation at the selected idle speed at which point the lever 102 is stabilized in response to the force balance on lever 102.

It will be understood that the compressor discharge pressure $P_c$ change for a given engine r.p.m. change under idle condition is relatively small in comparison to the change in discharge pressure $P_c$ for the same r.p.m. change under maximum speed condition. In order to compensate for the compressor discharge pressure $P_c$ effect at idle speed and maintain a substantially constant governor droop or gain at both idle and maximum spaced conditions, advantage is taken of the increased rate of change of pressure differential $P_c - P_c'$ across diaphragm 168 relative to compressor discharge air pressure $P_c$ as shown by the curves of FIGURE 3 when the heretofore mentioned pressure ratio $P_c/P_a < 2$ as is the case under idle speed condition. The abovementioned pressure $P_c$ vs. engine r.p.m. relationship at idle speed is further compensated for by the reduced effective spring rate of the governor created by the heretofore described expansion of compression spring 108 at idle speed.

It will be understood that the area relationship of orifice 188 and restriction 194 may be readily varied by suitable adjustment of valve 186 to obtain a desired $P_c V_s P_c - P_c'$ relationship corresponding to any one of the curves shown in FIGURE 3 depending upon the desired governor characteristics.

The spring retainer 110 may be adjusted on rod 112 to increase or decrease the effective length of compression spring 108 thereby varying the force tending to urge levers 102 and 104 apart accordingly which, in turn, determines the engine speed or corresponding force output of diaphragm 168 at which the spring 108 is rendered active or inactive depending upon whether the engine is accelerating or decelerating.

We claim:

1. Fuel control apparatus including a pneumatic speed governor for controlling the operation of a combustion engine, said governor apparatus comprising:
   speed reference force producing means;
   conduit means operatively connected to the engine and a source of relatively low air pressure through which air under pressure generated by the engine as a predetermined function of engine speed is passed;
   a first restriction in said conduit means for controlling air flow therethrough;
   a second restriction in said conduit means in series flow relationship with said first restriction and downstream therefrom;
   pressure responsive means responsive to the air pressure drop across said first restriction which pressure drop varies as a predetermined function of said engine generated air pressure depending upon the area ratio of said first and second restrictions;
   movable lever means operatively connected to said reference force producing means and said pressure responsive means and actuated in response to a force unbalance therebetween; and
   valve means operatively connected to said movable lever means for controlling fuel flow to the engine in response to movement of said lever means.

2. Governor apparatus as claimed in claim 1 wherein:
   said first restriction includes adjustable valve means for varying the effective flow area of said first restriction and thus the area ratio of said first and second restrictions.

3. Governor apparatus as claimed in claim 1 wherein:
   the rate of change of said pressure drop across said first restriction relative to said engine generated air pressure varies depending upon the ratio of engine generated-air pressure upstream of said first restriction to said relatively low air pressure downstream of said second restriction and being greater when said ratio of pressures is less than two.

4. Governor apparatus as claimed in claim 1 wherein said combustion engine includes an air compressor and said engine generated air pressure is compressor discharge air pressure.

5. Governor apparatus as claimed in claim 4 wherein:
   said reference force producing means includes a resilient member responsive to a control lever for producing a reference force which varies in accordance with the position of the lever;
   said movable lever means includes first and second lever members mounted for pivotal movement relative to one another;
   said first lever member being connected to and loaded by said resilient member;
   said second lever member being operatively connected to and loaded by said pressure responsive means;
   a second resilient force producing member operatively connected to said first and second lever members in series force relationship with said reference force;
   stop means operatively connected to one of said first and second lever members and engageable with the other of said first and second lever members for limiting the relative movement therebetween;
   said second resilient member being overcome in response to a predetermined force differential between said reference force producing resilient member and said pressure responsive means whereupon said stop means engages said other lever member to thereby eliminate the force effect of said second resilient member.

6. Governor apparatus as claimed in claim 5 wherein:
   said reference force producing resilient member is a tension spring;
   said second resilient member is a compression spring urging said first and second lever members apart.

7. Fuel control apparatus as claimed in claim 1 wherein the combustion engine is of the gas turbine type having an air compressor and:
   said engine generated air pressure is a compressor generated air pressure.

8. Fuel control apparatus as claimed in claim 7 wherein said operative connection between said movable lever means and said valve means includes:
   pressure responsive means connected to said valve means for actuating the same;
   conduit means communicating said pressure responsive means with said compressor generated air pressure;
   a valve member operatively connected to said last named conduit means and said movable lever means for modifying said compressor generated air pressure in response to said force unbalance acting on said movable lever means.

References Cited

UNITED STATES PATENTS

| 2,846,846 | 8/1958 | Mock | 60—39.28 |
| 3,332,232 | 7/1967 | Bevers | 60—39.28 |
| 3,371,481 | 3/1968 | Warne | 60—39.28 |

JULIUS E. WEST, *Primary Examiner.*

U.S. Cl. X.R.

137—98